United States Patent
Moosavi et al.

(10) Patent No.: US 10,574,413 B2
(45) Date of Patent: Feb. 25, 2020

(54) UPLINK PILOT REFERENCE SIGNALS

(71) Applicant: Telefonaktiebolaget LM Ericsson (publ), Stockholm (SE)

(72) Inventors: Reza Moosavi, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 34 days.

(21) Appl. No.: 15/752,350

(22) PCT Filed: Aug. 25, 2015

(86) PCT No.: PCT/SE2015/050894
§ 371 (c)(1),
(2) Date: Feb. 13, 2018

(87) PCT Pub. No.: WO2017/034445
PCT Pub. Date: Mar. 2, 2017

(65) Prior Publication Data
US 2018/0309554 A1   Oct. 25, 2018

(51) Int. Cl.
*H04L 5/00* (2006.01)
*H04L 25/02* (2006.01)
*H04W 16/28* (2009.01)

(52) U.S. Cl.
CPC ........ *H04L 5/0048* (2013.01); *H04L 25/0202* (2013.01); *H04W 16/28* (2013.01)

(58) Field of Classification Search
None
See application file for complete search history.

(56) References Cited

U.S. PATENT DOCUMENTS

2012/0127948 A1* 5/2012 Chung ............... H04L 5/0053
370/329
2016/0065341 A1* 3/2016 Yoo ................... H04W 72/0446
370/336

OTHER PUBLICATIONS

Arvidson, P., "Channel Estimation Error Model for SRS in LTE", KTH Electrical Engineering Project Master's Degree Project, 2011, pp. 1-60.
Third Generation Partnership Project. "Technical Specification Group Radio Access Network; Study on Elevation Beamforming/Full-Dimension (FD) MIMO for LTE (Release 13)"; 3GPP TR 36.897 V0.3.1; May 2015; pp. 1-36; Sophia Antipolis, Valbonne, France.
Alcatel-Lucent Shanghai Bell et al. "SRS Enhancements for 3D-MIMO"; 3GPP TSG RAN WG1 Meeting #82; Beijing, China; Aug. 24-28, 2015; pp. 1-2; R1-153815.

* cited by examiner

*Primary Examiner* — Robert M Morlan
(74) *Attorney, Agent, or Firm* — Coats & Bennett, PLLC

(57) ABSTRACT

There is provided mechanisms for assigning uplink pilot reference signals. A method is performed by a wireless device. The method comprises receiving an uplink grant and a downlink assignment for the wireless device, the uplink grant being associated with initially assigned uplink pilot reference signals. The method comprises determining at least one reciprocity pilot reference signal from the initially assigned uplink pilot reference signals, the uplink grant, and the downlink assignment. The method comprises transmitting the at least one reciprocity pilot reference signal in the uplink grant. There is provided mechanisms for detecting such uplink pilot reference signals.

22 Claims, 6 Drawing Sheets

UPLINK PILOT REFERENCE SIGNALS

TECHNICAL FIELD

Embodiments presented herein relate to uplink pilot reference signals, and particularly to methods, a wireless device, a network node, computer programs, and a computer program product for assigning uplink pilot reference signals and for detecting uplink pilot reference signals.

BACKGROUND

In communications networks, there may be a challenge to obtain good performance and capacity for a given communications protocol, its parameters and the physical environment in which the communications network is deployed.

For example, large antenna arrays have been introduced at cellular radio access network node and other wireless access points and have become a viable option to boost capacity and user data rates in the communications network. A radio access network node (RANN) or an access point (AP) equipped with excessive number of antennas, can simultaneously schedule multiple wireless devices, such as user equipment (UE) or stations (STA) at the same time/frequency interval with simple linear processing such as maximum-ratio transmission (MRT) or zero-forcing (ZF) in the downlink (DL), i.e. during communications from the RANN/AP to the wireless device, and maximum-ratio combining (MRC) or ZF in the uplink (UL), i.e., during communications from the wireless device to the RANN/AP. This is often referred to as very-large (or full dimension, FD) multiple-input multiple-output (VL-MIMO) or massive MIMO. Gains with VL-MIMO are achieved without consuming any additional spectrum. Additionally, the radiated energy efficiency with VL-MIMO can be substantially improved.

One non-limiting possible usage of FD MIMO technologies is (extreme) narrow beam forming for DL transmissions, that enables a RANN/AP to focus the transmitted energy to the desired wireless devices and thereby boosting the coverage and user data rates for DL transmissions.

For communications networks based on VL-MIMO it is not trivial how to acquire channel state information (CSI) in a scalable fashion. CSI is acquired for gaining performance potentials of the used excessive amount of transmit antennas. Traditionally, each wireless device continuously measures on the pilot (reference) symbols transmitted by the RANN/AP during the DL transmission phase to estimate the downlink channel gain and feeds it back to the RANN/AP via a reverse link during the UL transmission phase.

Since the number of required pilots in the downlink is proportional to the number of antennas at the RANN/AP, feedback based schemes are not scalable. Existing mechanisms for addressing this issue are based on operations performed in the time-division duplex (TDD) mode and rely on the channel reciprocity between the uplink and the downlink. More precisely, each wireless device transmits sounding reference signals (SRSs) in the uplink phase. These SRSs are then used by the RANN/AP to estimate both the uplink and downlink wireless channel. The number of uplink pilot signals used by RANNs/APs in such communications networks is proportional to the number of wireless devices scheduled in the same time frequency resource, which is typically significantly smaller than the number of antennas at the RANN/AP.

In an FD MIMO system there may be no need for DL demodulation reference signal (DMRS) since the channels towards the wireless devices are pre-equalized at the RANN/AP using proper precoders, such as maximum ratio transmission (MRT) or zero forcing (ZF). In a practical implementation downlink DMRS can still be present due to other considerations.

In existing systems, wireless channel sounding refers to the mechanism that enables a RANN or AP to obtain wideband channel state information in parts of the spectrum in which no wireless data transmission necessarily is taking place. Specifically, in cellular systems, a RANN has two main usages of wideband channel sounding. Firstly, to acquire UL channel state information in frequency and time resources in which a wireless device is currently not scheduled (even though the wireless device may currently use other parts of the spectrum). Secondly, to acquire UL channel state information of wireless devices that are currently not transmitting uplink data.

In existing systems, demodulation reference signals (DMRS) are used to enable coherent demodulation of the transmitted data. More precisely, the DMRS is inserted in-band with the data so that it goes through the same processing chain as does the data. This enables coherent demodulation of the data. Herein, the data includes any type of information to be communicated including DL payload data (transmitted for example in a Long Term Evolution (LTE) physical downlink shared channel—PDSCH), UL payload data (transmitted for example in an LTE physical uplink shared channel—PUSCH), DL control signaling (transmitted for example in an LTE physical downlink control channel—PDCCH), and UL control signaling (transmitted for example in an LTE physical uplink control channel—PUCCH).

FIG. 9 illustrates exemplary UL grants 910 and DL assignments 920 on a time frequency grid 900 for a wireless device according to a state-of-the-art system operating in TDD. In FIG. 9, the DL transmission phase and the UL transmission phase are illustrated. Additionally in this figure, the subset of frequency intervals that are assigned to a specific wireless device during DL and UL transmission phases is illustrated. The DL assignment and UL grant need not include the same frequency intervals and might overlap in some parts, as schematically illustrated in FIG. 9. In FIG. 9, DL DMRS 940a, 940b and UL DMRS 930a, 930b assignments are also illustrated. In some scenarios, there might be a sounding reference signal transmitted during the UL phase as described in above.

The wireless device may be equipped with more than one transmit and/or receive antennas. In such cases, it is possible to transmit more than one data-stream to the wireless device, thereby exploiting the additional degrees of freedom offered by having more than one antenna at the wireless device. This is often referred to as multi-layer transmission. In general terms, the number of possible data-streams in a MIMO system with $n_t$ number of transmit antennas and $n_r$ number of receive antennas is $\min(n_t, n_r)$, where $\min(n_t, n_r)$ denotes the minimum of $n_t$ and $n_r$.

In the current state-of-the-art schemes the UL DMRS and SRS are orthogonal resources. Hence, when the reference structures for UL DMRS and SRS are dual purpose, the assignments of pilot signals are not optimal if the current state-of-the-art orthogonal structure is used for assigning UL reference signals. This is due to the following two main reasons. Firstly, assigning two distinct orthogonal sequences for SRS and DMRS means that two orthogonal sequences per wireless device are needed and hence causes inefficient usage of orthogonal resources. Secondly, since some channel resources are needed for the transmission of DMRS and SRS, unnecessary pilot transmissions would result in inefficient usage of channel resources.

Hence, there is still a need for an improved assignment of uplink pilot reference signals.

SUMMARY

An object of embodiments herein is to provide efficient assignment of uplink pilot reference signals.

According to a first aspect there is presented a method for assigning uplink pilot reference signals. The method is performed by a wireless device. The method comprises receiving an uplink grant and a downlink assignment for the wireless device, the uplink grant being associated with initially assigned uplink pilot reference signals. The method comprises determining at least one reciprocity pilot reference signal from the initially assigned uplink pilot reference signals, the uplink grant, and the downlink assignment. The method comprises transmitting the at least one reciprocity pilot reference signal in the uplink grant.

Advantageously this provides efficient assignment of uplink pilot reference signals.

Advantageously this enables joint assignment of uplink pilot reference signals for coherent demodulation of uplink transmission and channel sounding needed for the subsequent downlink transmissions, only requiring the necessary pilot reference signals to be transmitted by the wireless device in the uplink.

According to a second aspect there is presented a wireless device for assigning uplink pilot reference signals. The wireless device comprises processing circuitry. The processing circuitry is configured to cause the wireless device to perform a set of operations. The processing circuitry is configured to cause the wireless device to receive an uplink grant and a downlink assignment for the wireless device, the uplink grant being associated with initially assigned uplink pilot reference signals. The processing circuitry is configured to cause the wireless device to determine at least one reciprocity pilot reference signal from the initially assigned uplink pilot reference signals, the uplink grant, and the downlink assignment. The processing circuitry is configured to cause the wireless device to transmit the at least one reciprocity pilot reference signal in the uplink grant.

According to a third aspect there is presented a computer program for assigning uplink pilot reference signals, the computer program comprising computer program code which, when run on processing circuitry of a wireless device, causes the wireless device to perform a method according to the first aspect.

According to a fourth aspect there is presented a method for detecting uplink pilot reference signals. The method is performed by a network node. The method comprises receiving transmission from a wireless device in an uplink grant, the transmission comprising at least one reciprocity pilot reference signal. The method comprises determining that at least one pilot reference signal is missing from the transmission. The method comprises detecting the at least one reciprocity pilot reference signal based on the at least one pilot reference signal being missed.

Advantageously this provides efficient detection of uplink pilot reference signals as assigned according to the first aspect.

Advantageously, joint assignment of uplink pilot reference signals enables the network node to co-schedule a large number of wireless devices, since unnecessary pilot reference signals are avoided and hence more wireless devices can be accommodated in the same time-frequency resources.

According to a fifth aspect there is presented a network node for detecting uplink pilot reference signals. The network node comprises processing circuitry. The processing circuitry is configured to cause the network node to perform a set of operations. The processing circuitry is configured to cause the network node to receive transmission from a wireless device in an uplink grant, the transmission comprising at least one reciprocity pilot reference signal. The processing circuitry is configured to cause the network node to determine that at least one pilot reference signal is missing from the transmission. The processing circuitry is configured to cause the network node to detect the at least one reciprocity pilot reference signal based on the at least one pilot reference signal being missed.

According to a sixth aspect there is presented a computer program for detecting uplink pilot reference signals, the computer program comprising computer program code which, when run on processing circuitry of a network node, causes the network node to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
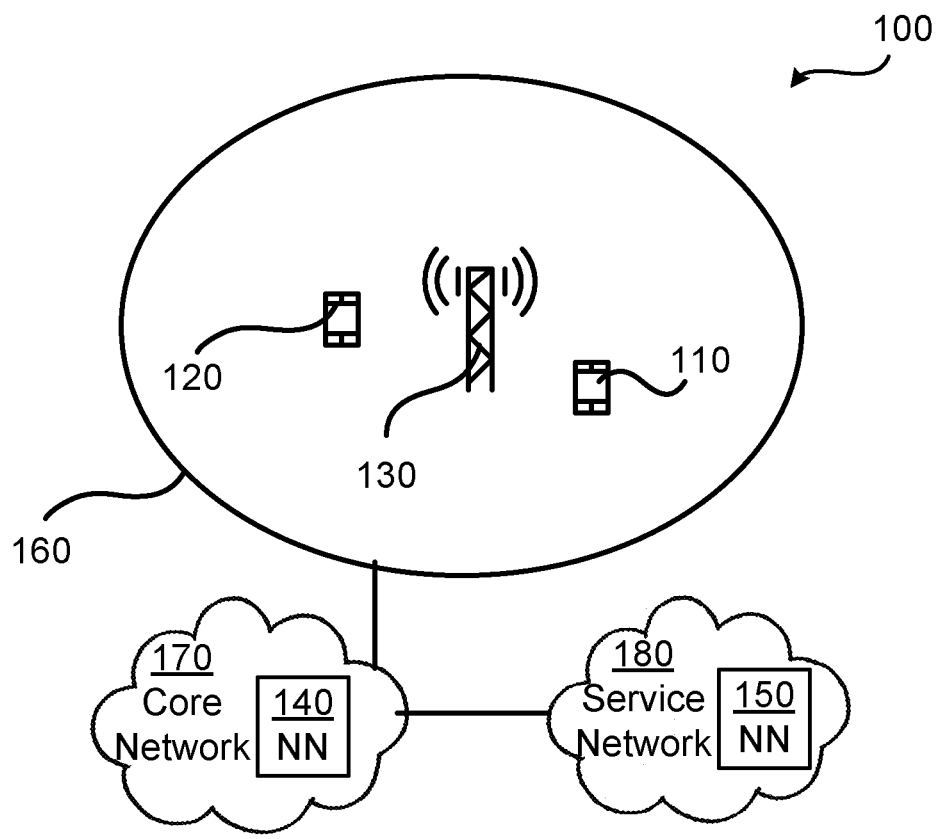
FIG. 1 is a schematic diagram illustrating a communication network according to embodiments.

FIG. 1 is a schematic diagram illustrating a communications network 100 where embodiments presented herein can be applied. The communications network 100 comprises a radio access network, as represented by network node 130 providing network access within a cell 160, a core network 170, and a service network 180. A wireless device 110 120, operatively connected to network node 130 may thereby access services and exchange data with the service network 180. The network node 130 may be radio access network node (RANN) such as a radio base station, a base transceiver station, a node B, an evolved node B, or a remote radio unit, or an access point (AP). Each wireless device 110, 120 may be a mobile station, a mobile phone, a handset, a wireless local loop phone, a user equipment (UE), a smartphone, a laptop a computer, a tablet computer, a modem, a sensor, or the like. The core network node 170 comprises a network node 140 and the service network 180 comprises a network node 150. These network nodes 140, 150 may complement the network node 130 and provide functionalities associated with the core network 170 and the service network 180, respectively.

In order for the wireless device 110, 120 to access services and exchange data with the service network 180 the wireless device 110, 120 needs to be scheduled. In general terms, the scheduling involves associating each wireless device 110, 120 with an UL grant and a DL assignment.

Figure 10:
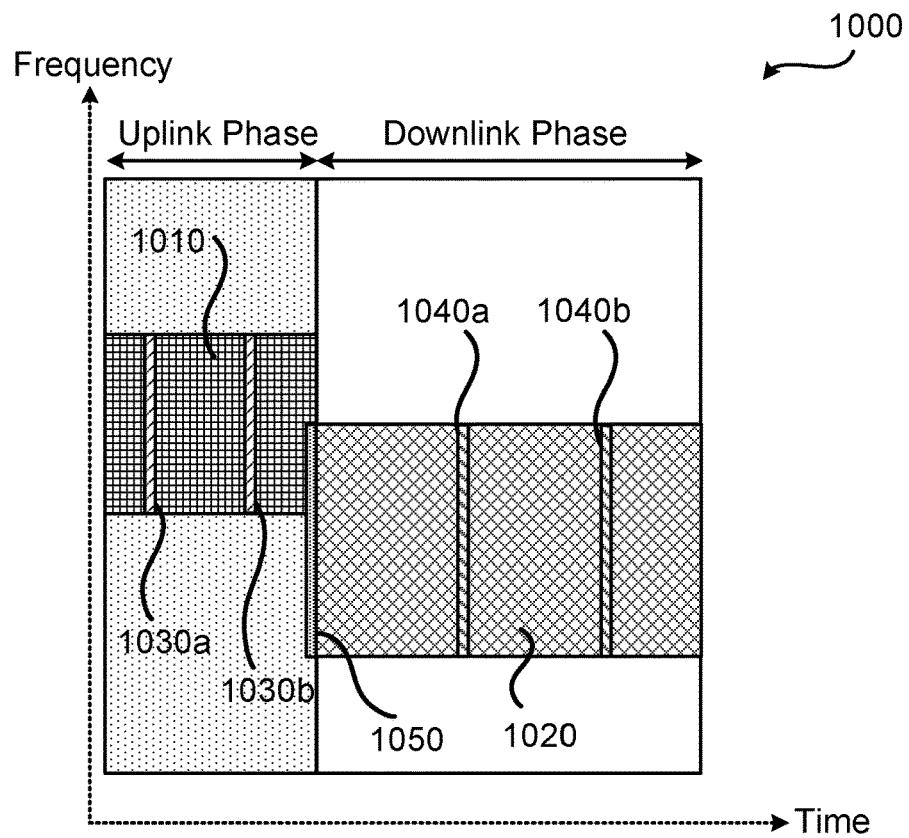

Consider the exemplary UL grant 1010 and DL assignments 1020 for a wireless device according to a state-of-the-art system operating in TDD as schematically illustrated in the time frequency grid 1000 of FIG. 10, where a single antenna port wireless device 110 is communication with a network node 130 equipped with M antenna ports in TDD mode. In practice, the UL and DL assignments 1010, 1020 in frequency might not cover the same frequency intervals and may overlap in some part. FIG. 10 further illustrates the time/frequency locations of the UL DMRS 1030*a*, 1030*b* and the DL DMRS 1040*z*, 1040*b*. The UL DMRSs 1030*a*, 1030*b* are needed for coherent demodulation of UL transmission (and hence the UL DMRS 1030*a*, 1030*b* should span the same frequency interval as the UL grant). FIG. 10 further illustrates the time/frequency locations of the UL SRS signal 1050. UL SRS signal 1050 is needed for precoder selection for the DL transmission (and hence should span the same frequency interval as the DL assignment). The UL SRS signal 1050 may span the whole bandwidth, regardless of the DL and UL scheduling assignments. In the frequency parts where UL and DL assignments 1010, 1020 overlap, there are unnecessarily many UL pilot signals and. As will be further disclosed below, it is therefore proposed to combine UL pilot signals into at least one UL reference signal denoted a reciprocity pilot reference signal (RPRS) that may span over the frequency intervals assigned to UL and DL.

In more detail, DMRS and SRS pilot signals may be jointly assigned based on the scheduling assignments for UL and DL. In essence, the joint assignment is based on the use of a new UL reference signal (i.e., the RPRS), where the function of the SRS and DMRS may be merged into a single UL reference signal (i.e., the RPRS). In the case, for example LTE, when both DMRS 930*a*, 930*b*, 1030*a*, 1030*b* and SRS 1050 are present, these two signals constitute examples of the RPRS according to this definition. The RPRS is transmitted in the UL by the wireless devices 110, 120, but in contrast to transmitting both UL DMRS 930*a*, 930*b*, 1030*a*, 1030*b* and SRS 1050 as in existing communications network, the wireless device 110, 1120 deploys the RPRS appropriately based on, for example, the UL and DL scheduling assignments.

The embodiments disclosed herein particularly relate to mechanisms for assigning UL pilot reference signals and for detecting UL pilot reference signals. In order to obtain such mechanisms there is provided a wireless device 110, a method performed by the wireless device 110, a computer program comprising code, for example in the form of a computer program product, that when run on processing circuitry of the wireless device 110, causes the wireless device 110 to perform the method. In order to obtain such mechanisms there is further provided a network node 130, 140, 150, a method performed by the network node 130, 140, 150, and a computer program comprising code, for example in the form of a computer program product, that when run on processing circuitry of the network node 130, 140, 150, causes the network node 130, 140, 150 to perform the method.

Figure 2A:
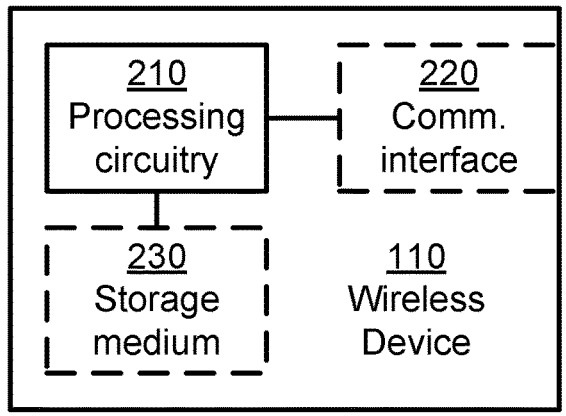
FIG. 2a is a schematic diagram showing functional units of a wireless device according to an embodiment.

FIG. 2*a* schematically illustrates, in terms of a number of functional units, the components of a wireless device 110 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410*a* (as in FIG. 4), e.g. in the form of a storage medium 230.

Particularly, the processing circuitry 210 is configured to cause the wireless device 110 to perform a set of operations, or steps, S102-S108. These operations, or steps, S102-S108 will be disclosed below. For example, the storage medium 230 may store the set of operations, and the processing circuitry 210 may be configured to retrieve the set of operations from the storage medium 230 to cause the wireless device 110 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 110 may further comprise a communications interface 220 for communications with a network node 130. As such the communications interface 220 may comprise one or more transmitters and receivers, comprising analogue and digital components and a suitable number of antennas for wireless communications and ports for wireline communications.

The processing circuitry 210 controls the general operation of the wireless device 110 e.g. by sending data and control signals to the communications interface 220 and the storage medium 230, by receiving data and reports from the communications interface 220, and by retrieving data and instructions from the storage medium 230. Other components, as well as the related functionality, of the wireless device 110 are omitted in order not to obscure the concepts presented herein.

Figure 2B:
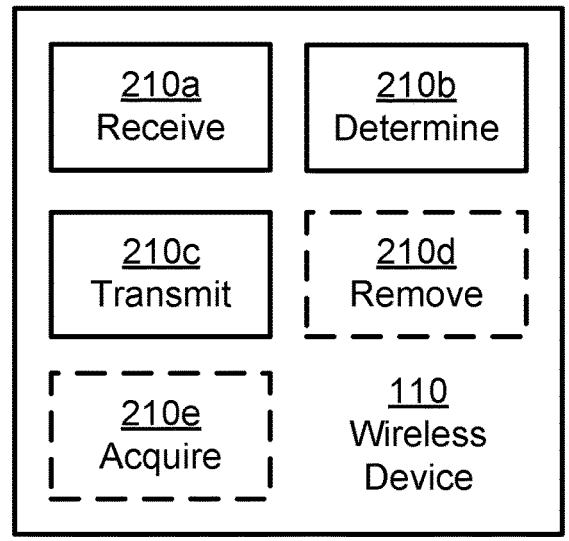
FIG. 2b is a schematic diagram showing functional modules of a wireless device according to an embodiment.

FIG. 2b schematically illustrates, in terms of a number of functional modules, the components of a wireless device 110 according to an embodiment. The wireless device 110 of FIG. 2b comprises a number of functional modules; a receive module 210a configured to perform below step S102, a determine module 210b configured to perform below steps S106, S106b, S106c, and a transmit module 210c configured to perform below step S108. The wireless device 110 of FIG. 2b may further comprises a number of optional functional modules, such as any of a remove module 210d configured to perform below step S106a, and an acquire module 210e configured to perform below step S104. The functionality of each functional module 210a-210e will be further disclosed below in the context of which the functional modules 210a-210e may be used. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps as will be disclosed hereinafter.

Figure 3A:
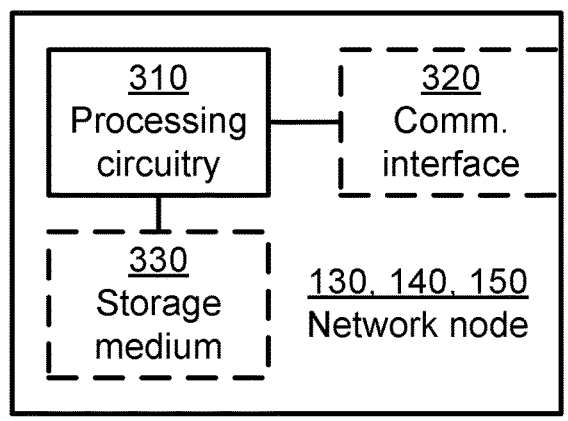
FIG. 3a is a schematic diagram showing functional units of a network node according to an embodiment.

FIG. 3a schematically illustrates, in terms of a number of functional units, the components of a network node 130, 140, 150 according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 4), e.g. in the form of a storage medium 330.

Particularly, the processing circuitry 310 is configured to cause the network node 130, 140, 150 to perform a set of operations, or steps, S202-S216. These operations, or steps, S202-S216 will be disclosed below. For example, the storage medium 330 may store the set of operations, and the processing circuitry 310 may be configured to retrieve the set of operations from the storage medium 330 to cause the network node 130, 140, 150 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 130, 140, 150 may further comprise a communications interface 320 for communications with at least one wireless device 110, 120, an entity in the core network 170 and an entity in the service network 180. As such the communications interface 320 may comprise one or more transmitters and receivers, comprising analogue and digital components and a suitable number of antennas for wireless communications and ports for wireline communications.

The processing circuitry 310 controls the general operation of the network node 130, 140, 150 e.g. by sending data and control signals to the communications interface 320 and the storage medium 330, by receiving data and reports from the communications interface 320, and by retrieving data and instructions from the storage medium 330. Other components, as well as the related functionality, of the network node 130, 140, 150 are omitted in order not to obscure the concepts presented herein.

Figure 3B:
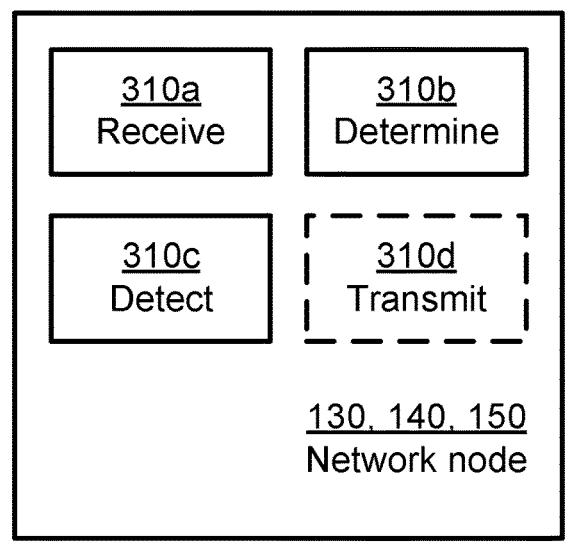
FIG. 3b is a schematic diagram showing functional modules of a network node according to an embodiment.

FIG. 3b schematically illustrates, in terms of a number of functional modules, the components of a network node 130, 140, 150 according to an embodiment. The network node 130, 140, 150 of FIG. 3b comprises a number of functional modules; a receive module 310a configured to perform below step S204, a determine module 310b configured to perform below steps S206, S206b, S214, and a detect module 310c configured to perform below steps S206a, S208. The network node 130, 140, 150 of FIG. 3b may further comprise a number of optional functional modules, such as a transmit module 310d configured to perform below steps S202, S216. The functionality of each functional module 310a-310d will be further disclosed below in the context of which the functional modules 310a-310d may be used. In general terms, each functional module 310a-310d may be implemented in hardware or in software. Preferably, one or more or all functional 310a-310d may be implemented by the processing circuitry 310, possibly in cooperation with functional units 320 and/or 330. The processing circuitry 310 may thus be arranged to from the storage medium 330 fetch instructions as provided by a functional module 310a-310d and to execute these instructions, thereby performing any steps as will be disclosed hereinafter.

The network node 130, 140, 150 may be provided as a standalone device or as a part of at least one further device. For example, the network node 130, 140, 150 may be provided in a node 130 of the radio access network or in a node 140 of the core network 170 or even in a node 150 of the service network 180. Alternatively, functionality of the network node 130, 140, 150 may be distributed between at least two devices, or nodes. These at least two nodes, or devices, may either be part of the same network part (such as the radio access network, the core network 170 or the service network 180) or may be spread between at least two such network parts. In general terms, instructions that are required to be performed in real time may be performed in a device, or node, operatively closer to the cell 160 than instructions that are not required to be performed in real time. In this respect, at least part of the network node 130, 140, 150 may reside in the radio access network, such as in the network node 130, for cases when embodiments as disclosed herein are performed in real time.

Thus, a first portion of the instructions performed by the network node 130, 140, 150 may be executed in a first device, and a second portion of the of the instructions performed by the network node 130, 140, 150 may be executed in a second device; the herein disclosed embodiments are not limited to any particular number of devices on which the instructions performed by the network node 130, 140, 150 may be executed. Hence, the methods according to the herein disclosed embodiments are suitable to be performed by a network node 130, 140, 150 residing in a cloud computational environment. Therefore, although a single processing circuitry 310 is illustrated in FIG. 3a the processing circuitry 310 may be distributed among a plurality of devices, or nodes. The same applies to the functional modules 310a-310d of FIG. 3b and the computer program 420b of FIG. 4 (see below).

Figure 4:
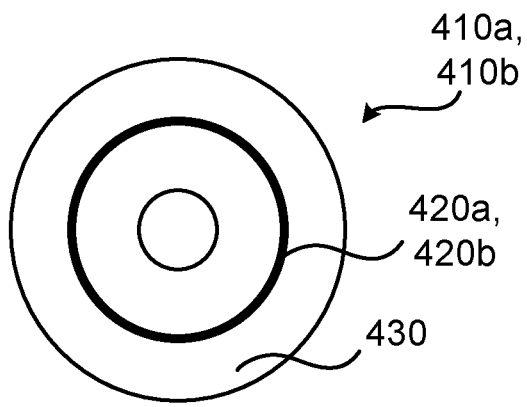
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the wireless device 110 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the network node 130, 140, 150 as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figure 5:
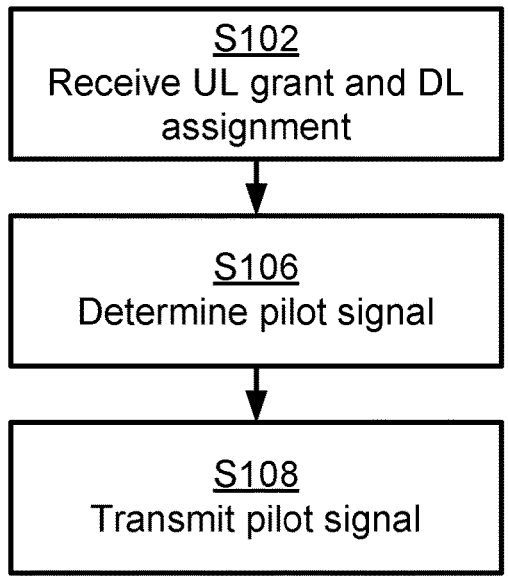
FIGS. 5, 6, 7, and 8 are flowcharts of methods according to embodiments.
Figure 6:
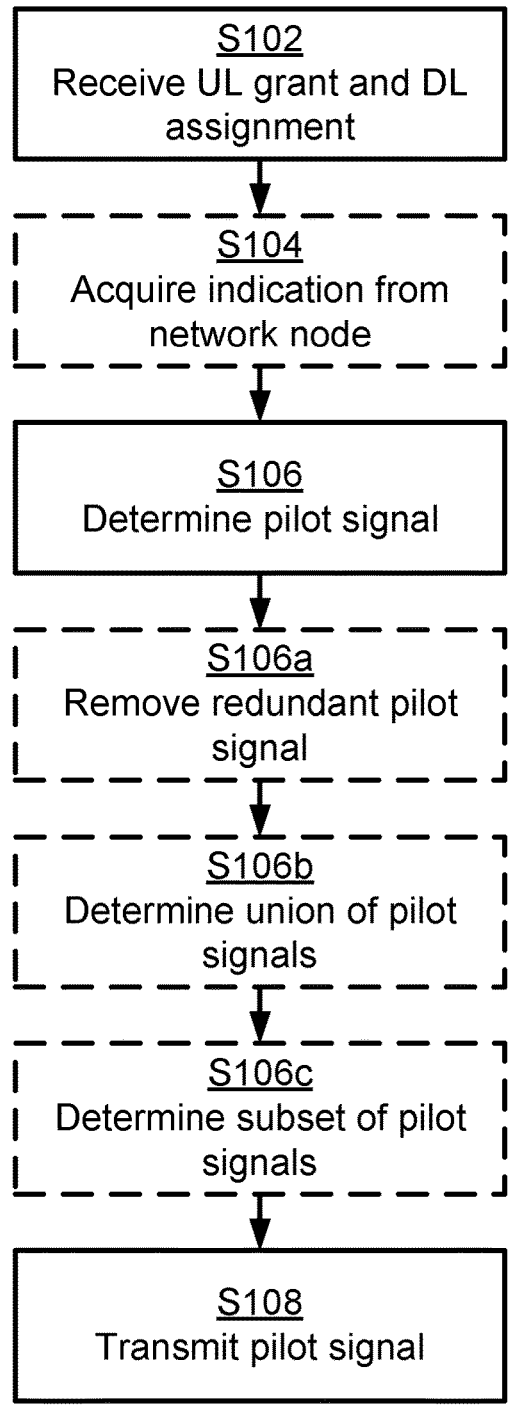
Figure 7:
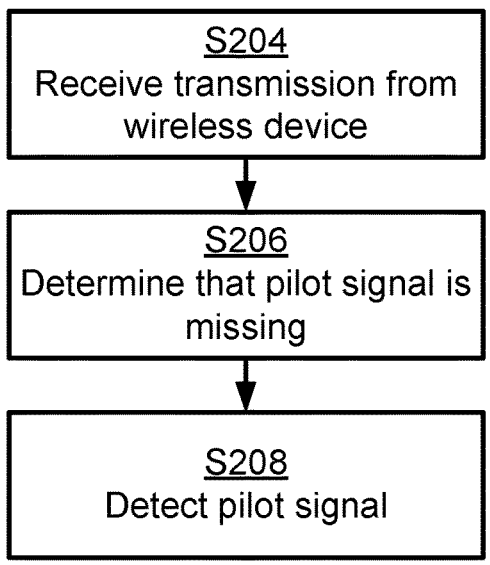
Figure 8:
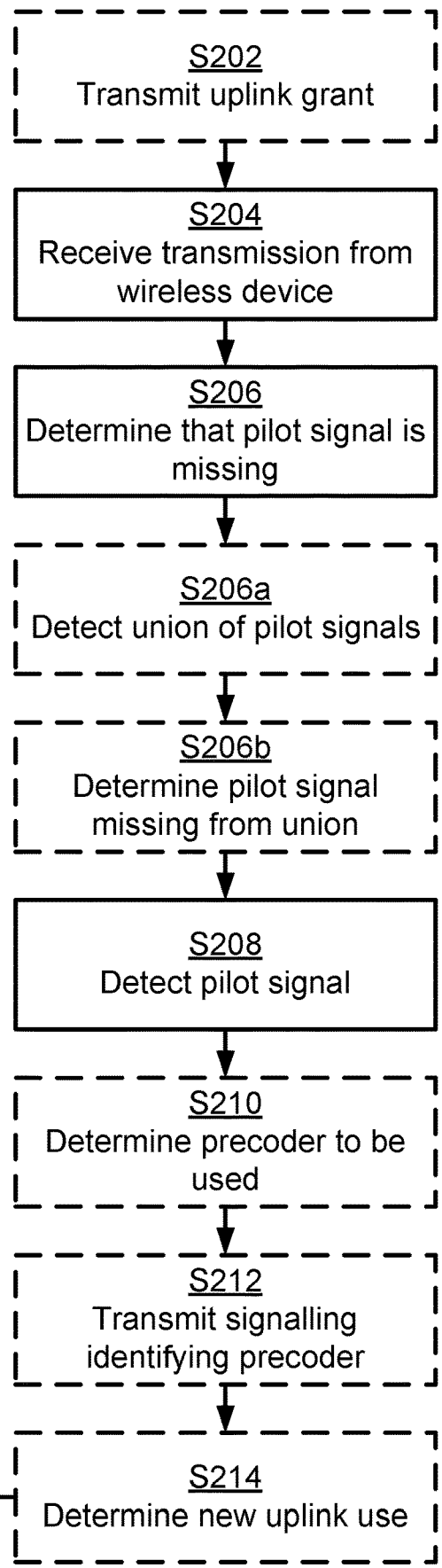

FIGS. 5 and 6 are flow charts illustrating embodiments of methods for assigning UL pilot reference signals as performed by the wireless device 110. FIGS. 7 and 8 are flow charts illustrating embodiments of methods for detecting UL pilot reference signals as performed by the network node 130, 140, 150. The methods are advantageously provided as computer programs 420a, 420b.

Reference is now made to FIG. 5 illustrating a method for assigning UL pilot reference signals as performed by the wireless device 110 according to an embodiment.

The wireless device 110 is configured to, in a step S102, receive an UL grant 910, 1010, 1110, 1210 and a DL assignment 920, 1020, 1120, 1220 for the wireless device 110. The UL grant 910, 1010, 1110, 1210 is associated with initially assigned UL pilot reference signals 930a, 930b, 1030a, 1030b, 1050. In this respect the receive module 210a may comprise instructions that when executed by the wireless device 110 causes the processing circuitry to, via the communications interface 220, receive the UL grant and the DL assignment in order for the wireless device 110 to perform step S102.

The wireless device 110 uses the received information to determine new pilot reference signals to be transmitted. These new pilot reference signals are the above noted reciprocity pilot reference signals (RPRS). As noted above and as will also be disclosed in further detail below, the RPRS can be either a DMRS or a SRS if they can serve the purpose of the other. Particularly, the wireless device 110 is configured to, in a step S106, determine at least one reciprocity pilot reference signal 1130, 1230a, 1230b, 1250 from the initially assigned UL pilot reference signals 930a, 930b, 1030a, 1030b, 1050, the UL grant 910, 1010, 1110, 1210, and the DL assignment 920, 1020, 1120, 1220. In this respect the determine module 210b may comprise instructions that when executed by the wireless device 110 causes the processing circuitry 210 to determine such at least one reciprocity pilot reference signal in order for the wireless device 110 to perform step S106.

Non-limiting embodiments regarding how the wireless device 110 may use the initially assigned UL pilot reference signals 930a, 930b, 1030a, 1030b, 1050, the UL grant 910, 1010, 1110, 1210, and the DL assignment 920, 1020, 1120, 1220 to determine the at least one RPRS 1130, 1230a, 1230b, 1250 will be disclosed below.

The new pilot reference signals are then transmitted. Thus, the wireless device 110 is configured to, in a step S108, transmit the at least one RPRS 1130, 1230a, 1230b, 1250 in the UL grant 910, 1010, 1110, 1210. In this respect the transmit module 210c may comprise instructions that when executed by the wireless device 110 causes the processing circuitry 210 to, via the communications interface 220, transmit the at least one RPRS in order for the wireless device 110 to perform step S108.

Figure 9:
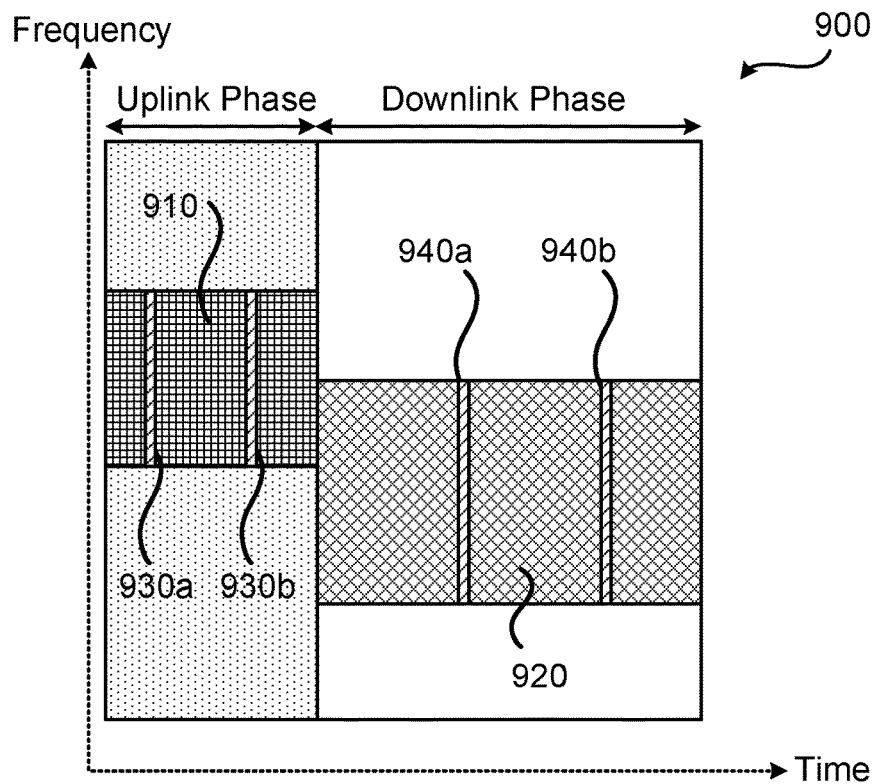
FIGS. 9 and 10 are schematic illustrations of uplink and downlink assignments according to state-of-the-art.
Figure 11:
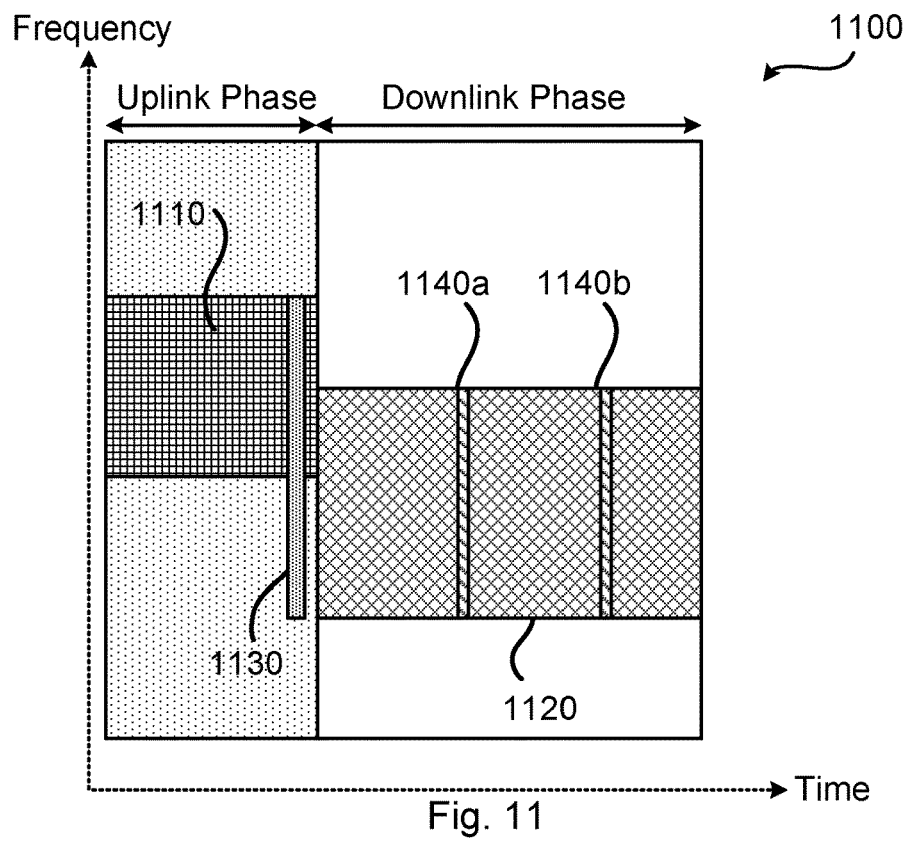
FIGS. 11 and 12 are schematic illustrations of uplink and downlink assignments according to embodiments.

FIG. 11 illustrates exemplary UL grants 1110 and DL assignments 1120 on a time frequency grid 1100 for a wireless device 110 according to embodiments. In FIG. 11, the DL transmission phase and the UL transmission phase are illustrated. Additionally in FIG. 11, the subset of frequency intervals that are assigned to a specific wireless device 11 during DL and UL transmission phases is illustrated. The DL assignment 1120 and UL grant 1110 need not include the same frequency intervals and might overlap in some parts, as schematically illustrated in FIG. 11. DL assignments of DMRS 1140a, 1140b are also illustrated. Further, a single RPRS 1130 is illustrated. Thus, in comparison to the exemplary UL grants 910, 1010 and DL assignments 920, 1020 for the wireless device 110 illustrated in FIGS. 9 and 10, the initially assigned UL pilot reference signals (DMRS) 930a, 930b, 1030a, 1030b have been removed and the single RPRS 1130 represents the UL pilot reference signal (SRS) 1050.

Embodiments relating to further details of assigning UL pilot reference signals as performed by the wireless device 110 will now be disclosed.

There may be different uses of the RPRS 1130, 1230a, 1230b, 1250. Different embodiments related thereto will now be disclosed in turn.

For example, the at least one RPRS 1130, 1230a, 1230b, 1250 may be used for coherent demodulation of UL transmission and channel sounding needed for subsequent DL transmissions. That is, the at least one RPRS 1130, 1230a, 1230b, 1250 is used for coherent demodulation of UL transmission from the wireless device 110 and channel sounding needed for precoding subsequent DL transmissions to the wireless device 110.

For example, the at least one RPRS 1130, 1230a, 1230b, 1250 may be used as DMRS and/or SRS. Hence, each at least one RPRS 1130, 1230a, 1230b, 1250 may represent at least part of a Demodulation Reference Signal or a Sounding Reference Signal.

For example, the at least one RPRS 1130, 1230a, 1230b, 1250 may represent merged DMRS and/or SRS signals. Hence, each at least one RPRS 1130, 1230a, 1230b, 1250 may represent a combination of at least two Demodulation Reference Signals or a combination of at least one Demodulation Reference Signal and at least one Sounding Reference Signal.

There may be different number of at least one RPRS 1130, 1230*a*, 1230*b*, 1250 being determined. According to an embodiment a single RPRS 1130, 1230*a*, 1230*b*, 1250, i.e., one single RPRS, is determined.

Figure 12:
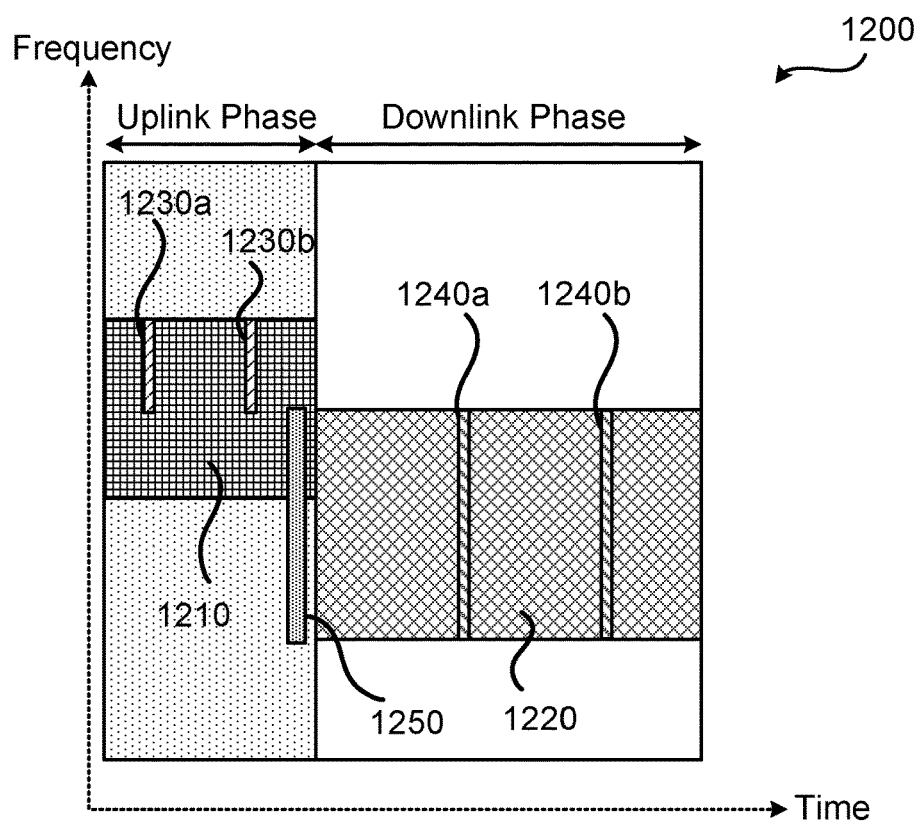

The UL grant 910, 1010, 1110, 1210 may span a first frequency interval and the DL assignment 920, 1020, 1120, 1220 may span a second frequency interval. According to another embodiment multiple RPRS are determined, each covering part of these frequency intervals. That is, at least two RPRSs 1130, 1230*a*, 1230*b*, 1250 may be determined. Each individual RPRS 1130, 1230*a*, 1230*b*, 1250 may then span less than the first frequency interval and the second frequency interval. In some embodiment the at least one RPRS 1130, 1230*a*, 1230*b*, 1250 is assigned only over the DL assignment 920, 1020, 1120, 1220 and hence only some parts of the UL DMRS 1230*a*, 1230*b* could be removed. This is illustrated in FIG. 12. FIG. 12 illustrates exemplary UL grants 1210 and DL assignments 1220 on a time frequency grid 1200 for a wireless device 110 according to embodiments. In FIG. 12, the DL transmission phase and the UL transmission phase are illustrated. Additionally in FIG. 12, the subset of frequency intervals that are assigned to a specific wireless device 110 during DL and UL transmission phases is illustrated. The DL assignment 1220 and UL grant 1210 need not include the same frequency intervals and might overlap in some parts. DL assignments of DMRS 1240*a*, 1240*b* are also illustrated. Further, a single RPRS 1250 is illustrated. This can represent an implementation where the at least one RPRS 1130, 1230*a*, 1230*b*, 1250 may constitute of what is denoted UL DMRS and sometimes what is denoted SRS in the LTE specifications. According to yet another embodiment the at least one RPRS 1130, 1230*a*, 1230*b*, 1250 spans the first frequency interval and the second frequency interval. This is illustrated in FIG. 11.

There may be different positions in the UL grant 910, 1010, 1110, 1210 for the wireless device 110 to transmit the at least one RPRS 1130, 1230*a*, 1230*b*, 1250. For example, the at least one RPRS 1130, 1230*a*, 1230*b*, 1250 may, during the UL grant 910, 1010, 1110, 1210, be transmitted so as to leave free at least one transmission time interval (TTI) or orthogonal frequency-division multiplexing (OFDM) symbol at the end of the UL grant 910, 1010, 1110, 1210. This may allow the network node 130, 140, 150 to determine a precoder based on the at least one RPRS 1130, 1230*a*, 1230*b*, 1250 for the next UL grant 910, 1010, 1110, 1210 for the wireless device 110.

Reference is now made to FIG. 6 illustrating methods for assigning UL pilot reference signals as performed by the wireless device 110 according to further embodiments.

There may be different ways for the wireless device 110 regarding how to determine the at least one RPRS 1130, 1230*a*, 1230*b*, 1250. Different embodiments relating thereto will now be described in turn.

For example, this can be enabled by the wireless device 110 either using explicitly signaling from network node 130, 140, 150 or implicitly through that the wireless device 110 autonomously removes unnecessary pilot reference signals using a predefined procedure.

In one embodiment the wireless device 110 interprets the assignment of pilot reference signals in the UL grant and the DL assignment jointly by a preconfigured method using explicitly signalling from the network node 130, 140, 150. Hence, according to an embodiment the wireless device 110 is configured to, in a step S104, acquire an indication in order for the wireless device 110 to perform step S104.

In one embodiment the wireless device 110 interprets the assignment of pilot reference signals in the UL grant and the DL assignment jointly by a preconfigured method implicitly through that the wireless device 110 autonomously removes unnecessary pilot reference signals using a predefined procedure. Hence, according to an embodiment the wireless device 110 is pre-configured regarding how to determine the at least one RPRS 1130, 1230*a*, 1230*b*, 1250 from the initially assigned UL pilot reference signals 930*a*, 930*b*, 1030*a*, 1030*b*, 1050, the UL grant 910, 1010, 1110, 1210, and the DL assignment 920, 1020, 1120, 1220.

In some embodiments the wireless device 110 will remove one or more pilot reference signals in the DL assignment if these pilot reference signals serve the same purpose as some of the pilot reference signals in the UL-grant. Hence, according to an embodiment determining the at least one RPRS 1130, 1230*a*, 1230*b*, 1250 involves the wireless device 110 to be configured to, in a step S106*a*, remove redundant initially assigned UL pilot reference signals 930*a*, 930*b*, 1030*a*, 1030*b*, 1050 from initially assigned UL pilot reference signals 930*a*, 930*b*, 1030*a*, 1030*b*, 1050. In this respect the remove module 210*d* may comprise instructions that when executed by the wireless device 110 causes the processing circuitry 210 to remove initially assigned UL pilot reference signals in order for the wireless device 110 to perform step S106*a*.

The reason that these UL pilot reference signals can be removed is due to the fact that the UL pilot reference signals is used for both coherent demodulation of UL data and also for channel sounding needed for precoding the DL data. That is, one initially assigned UL pilot reference signal 930*a*, 930*b*, 1030*a*, 1030*b*, 1050 may be determined redundant if at least one pilot reference signal in the UL grant 910, 1010, 1110, 1210 and one initially assigned UL pilot reference signal 930*a*, 930*b*, 1030*a*, 1030*b*, 1050 serve a common purpose. Hence, embodiments disclosed herein enable removal of unnecessary reference signals using the knowledge that the pilot reference signal is a dual-purpose reference signal.

In some embodiments the wireless device 110 will remove one or more pilot reference signals in the DL assignment if these pilot reference signals transmitted over the same antenna port and in the same resource block. That is, one initially assigned UL pilot reference signal 930*a*, 930*b*, 1030*a*, 1030*b*, 1050 may be determined if the one initially assigned UL pilot reference signal 930*a*, 930*b*, 1030*a*, 1030*b*, 1050 and another initially assigned UL pilot reference signal 930*a*, 930*b*, 1030*a*, 1030*b*, 1050 are to be transmitted over a common antenna port and resource block.

In some embodiments where the wireless device 110 has more than one antenna port, there might be multi-layer transmissions applied during DL and/or UL. In these situations, some of the unnecessary DMRS signals can be removed. Hence, the UL grant 910, 1010, 1110, 1210 the DL assignment 920, 1020, 1120, 1220 may relate to multi-layer transmissions using at least two antenna ports. Multi-layer transmissions may then be applied during the UL grant 910, 1010, 1110, 1210 and/or the DL assignment 920, 1020, 1120, 1220. For example, assume that the wireless device 110 is configured for single-layer transmission during UL using antenna port 1, but receives four-layer DL transmissions over the antenna ports 1, 2, 3 and 4. For simplicity of exposition, assume that the UL and DL assignments cover the same frequency intervals. In this case, to facilitate DL transmission the channel should be sounded over antenna ports 1, 2, 3 and 4 and the DMRS is needed only on antenna port 1 where the UL transmission takes place. Thus, in this case the herein disclosed RPRS 1130, 1230a, 1230b, 1250 can be applied over the antenna ports 1, 2, 3 and 4 and hence there would be no need for DMRS for antenna port 1.

In some embodiments a UL pilot reference signal is regarded redundant if there is another UL pilot reference signal beam-formed in the same way. In more detail, in some embodiments and when the wireless device 110 has more than one antenna elements, the wireless device 110 may apply beamforming during UL transmission. That is, one initially assigned UL pilot reference signal 930a, 930b, 1030a, 1030b, 1050 may be determined redundant if this one initially assigned UL pilot reference signal 930a, 930b, 1030a, 1030b, 1050 and another initially assigned UL pilot reference signal 930a, 930b, 1030a, 1030b, 1050 are beam-formed into a common beam-shape and/or common beam-direction (e.g., based on the same common precoder). Further, the DMRS and SRS can be merged if the wireless device 110 also uses the same precoding for channel sounding. Therefore, the herein proposed RPRS 1130, 1230a, 1230b, 1250 can be used in this case too and hence there would be no need for explicit UL DMRS. When the wireless device 110 applies beamforming during the UL grant 910, 1010, 1110, 1210 at least two of the initially assigned UL pilot reference signals 930a, 930b, 1030a, 1030b, 1050 may be combined if the same precoding is used for channel sounding during the beamforming.

There may be different ways for the wireless device 110 to determine the at least one RPRS 1130, 1230a, 1230b, 1250 in step S106. For example, the wireless device 110 may be configured to, in a step S106b, determine a union of the initially assigned UL pilot reference signals 930a, 930b, 1030a, 1030b, 1050; and, in a step S106c, determine a true subset of the initially assigned UL pilot reference signals 930a, 930b, 1030a, 1030b, 1050 by removing redundant initially assigned UL pilot reference signals 930a, 930b, 1030a, 1030b, 1050 from the union. The true subset of the initially assigned UL pilot reference signals 930a, 930b, 1030a, 1030b, 1050 thereby defines the at least one RPRS. In this respect the determine module 210b may comprise instructions that when executed by the wireless device 110 causes the processing circuitry 210 to determine the union and to determine the true subset in order for the wireless device 110 to perform steps S106b and S106c.

Reference is now made to FIG. 7 illustrating a method for detecting UL pilot reference signals as performed by the network node 130, 140, 150 according to an embodiment.

As noted above, the wireless device 110 is configured to, in a step S108, transmit at least one reciprocity pilot reference signal (RPRS) 1130, 1230a, 1230b, 1250 in an UL grant 910, 1010, 1110, 1210. The network node 130, 140, 150 is therefore configured to, in a step S204, receive transmission from the wireless device 110 in the UL grant 910, 1010, 1110, 1210. The transmission comprises at least one reciprocity pilot reference signal as defined above. In this respect the receive module 310a may comprise instructions that when executed by the network node 130, 140, 150 causes the processing circuitry 310 to, via the communications interface 320, receive such transmission in order for the network node 130, 140, 150 to perform step S204.

As noted above, the at least one RPRS is used to replace initially assigned UL pilot reference signals 930a, 930b, 1030a, 1030b, 1050. Therefore the network node 130, 140, 150 is configured to, in a step S206, determine that at least one pilot reference signal is missing from the transmission. In this respect the determine module 310b may comprise instructions that when executed by the network node 130, 140, 150 causes the processing circuitry 310 to make such a determination in order for the network node 130, 140, 150 to perform step S206.

The network node 130, 140, 150 uses information of the at least one pilot reference signal being missing from the transmission to detect the at least one RPRS. Hence, the network node 130, 140, 150 is configured to, in a step S208, detect the at least one RPRS 1130, 1230a, 1230b, 1250 based on the at least one pilot reference signal being missed. In this respect the detect module 310c may comprise instructions that when executed by the network node 130, 140, 150 causes the processing circuitry 310 to make such a detection in order for the network node 130, 140, 150 to perform step S208.

Embodiments relating to further details of detecting UL pilot reference signals as performed by the network node 130, 140, 150 will now be disclosed.

There may be different ways for the network node 130, 140, 150 to determine that the at least one pilot reference signal is missing. Different embodiments relating thereto will now be described in turn. The determining may be based on implicit information. Hence, according to one embodiment determining that the at least one pilot reference signal is missing is based on channel estimates of said transmission. The determining may be based on explicit information. Hence, according to another embodiment determining that the at least one pilot reference signal is missing is based on signalling previously having been transmitted by the network node 130, 140, 150 to the wireless device 110. Hence, the determining may be based on DL signalling. Thus, DL signalling may comprise the explicit assignment. Hence, the DL signalling may comprise an assignment of the at least one RPRS 1130, 1230a, 1230b, 1250 to be used by the wireless device 110 in the UL grant 910, 1010, 1110, 1210.

In some embodiments, the DL DMRS can be removed since the network node 130, 140, 150, by appropriately choosing the DL precoder, can pre-equalize the channel towards the wireless device 110 such that the received symbol can be coherently decoded at the wireless device 110 without the need for explicit channel estimation. Hence, according to an embodiment the at least one RPRS 1130, 1230a, 1230b, 1250 is assigned by the network node 130, 140, 150 for coherent demodulation of UL transmission from the wireless device 110 and/or for coherent demodulation of DL transmission from the network node 130, 140, 150. Further, the at least one RPRS 1130, 1230a, 1230b, 1250 may be assigned by the network node 130, 140, 150 for channel sounding needed by the network node 130, 140, 150 for precoding subsequent DL transmissions to the wireless device 110. Hence, one reciprocity reference signal may even be used for demodulation of DL transmissions.

Reference is now made to FIG. 8 illustrating methods for detecting UL pilot reference signals as performed by the network node 130, 140, 150 according to further embodiments.

There may be different ways for the network node 130, 140, 150 to trigger the wireless device 110 to transmit pilot reference signal. For example, the network node 130, 140, 150 may be configured to, prior to receiving the at least one RPRS, in a step S202, transmit an UL grant 910, 1010, 1110,

1210 and a DL assignment 920, 1020, 1120, 1220 for the wireless device 110 to the wireless device 110. As noted above, the UL grant 910, 1010, 1110, 1210 is associated with initially assigned UL pilot reference signals 930a, 930b, 1030a, 1030b, 1050. In this respect the transmit module 310d may comprise instructions that when executed by the network node 130, 140, 150 causes the processing circuitry 310 to, via the communications interface 320, transmit the UL grant and the DL assignment in order for the network node 130, 140, 150 to perform step S202.

There may be different ways for the network node 130, 140, 150 to determine that the at least one pilot reference signal is missing. For example, the network node 130, 140, 150 may detect that DRMS and/or SRS may be missing from a union of reference signals. Particularly, determining that the at least one pilot reference signal is missing may involve the network node 130, 140, 150 to, in a step S206a, be configured to detect a union of pilot reference signals in the transmission. The network node 130, 140, 150 may then further be configured to, in a step S206b, determine that the at least one pilot reference signal is missing from the union.

There may be different ways for the network node 130, 140, 150 to detect the at least one RPRS 1130, 1230a, 1230b, 1250 based on the at least one pilot reference signal being missed, as in step S208. For example, detecting the RPRS 1130, 1230a, 1230b, 1250 may comprise determining a correlation between a set of received resources in the transmission received from the wireless device 110 in the uplink grant 910, 1010, 1110, 1210 in step S204 and an RPRS-signal value. An RPRS 1130, 1230a, 1230b, 1250 is then detected if the correlation is above a first threshold on this set of resources. For example, a pilot reference signaling may then be regarded as being missing if the correlation is below a second threshold on this set of resources. The first threshold may be identical to the second threshold. Alternatively, the first threshold is different from the second threshold. Having the first threshold different from the second threshold may enable the first threshold and the second threshold to be selected so as to minimize the risk of false positives and/or false negatives.

There may be different ways for the network node 130, 140, 150 to act once having detected the at least one RPRS 1130, 1230a, 1230b, 1250.

For example, the network node 130, 140, 150 may use the at least one RPRS 1130, 1230a, 1230b, 1250 to determine a precoder for the wireless device. Particularly, according to an embodiment the network node 130, 140, 150 is configured to, in a step S210, determine a precoder to be used by the wireless device 110 in a next UL grant 910, 1010, 1110, 1210. The precoder is determined based on the at least one RPRS 1130, 1230a, 1230b, 1250. In this respect the determine module 310b may comprise instructions that when executed by the network node 130, 140, 150 causes the processing circuitry 310 to determine such a precoder in order for the network node 130, 140, 150 to perform step S210. The network node 130, 140, 150 may then further be configured to, in a step S212, transmit, in a DL assignment 920, 1020, 1120, 1220, signalling identifying the precoder to the wireless device 110. In this respect the transmit module 310d may comprise instructions that when executed by the network node 130, 140, 150 causes the processing circuitry 310 to, via the communications interface 320, transmit such signalling in order for the network node 130, 140, 150 to perform step S210.

For example, the network node 130, 140, 150 may use the at least one RPRS 1130, 1230a, 1230b, 1250 to determine a new UL use for pilot reference signals that are no longer transmitted by the wireless device 110. Particularly, according to an embodiment the network node 130, 140, 150 is configured to, in a step S214, determine new UL use for the at least one missing pilot reference signal. In this respect the determine module 310b may comprise instructions that when executed by the network node 130, 140, 150 causes the processing circuitry 310 to determine such a new UL use in order for the network node 130, 140, 150 to perform step S214. The network node 130, 140, 150 may then further be configured to, in a step S216, transmit DL signalling regarding the new UL use for the at least one missing pilot reference signal. In this respect the transmit module 310d may comprise instructions that when executed by the network node 130, 140, 150 causes the processing circuitry 310 to, via the communications interface 320, transmit such DL signalling in order for the network node 130, 140, 150 to perform step S216.

There may be different kinds of new UL uses for pilot reference signals that are no longer transmitted by the wireless device 110. For example, the timeslots for these the pilot reference signals that are no longer transmitted may be assigned to other wireless devices. Hence, the DL signalling may be transmitted to another wireless device 120, and the new UL use may be associated with an UL grant 910, 1010, 1110, 1210 for this another wireless device 120. Thus, in some embodiments, the DL DMRS 1240a, 1240b may also be removed since the network node 130, 140,150, by appropriately choosing the DL precoder, can pre-equalize the channel towards the wireless device 110 such that the received symbol can be coherently decoded at the wireless device 110 without the need for explicit channel estimation.

In summary, there have been disclosed embodiments for jointly assigning the UL pilot reference signals used for coherent demodulation of UL transmission and for channel sounding needed for DL precoder selection. According to some embodiments, two UL pilot reference signals are merged into one UL pilot signal, denoted a RPRS. In essence, there have been proposed method for assigning UL pilot reference signals where a wireless device 110 receives an UL grant 910, 1010, 1110, 1210 and a DL assignment 920, 1020, 1120, 1220 for the wireless device 110, collects the union of initially assigned UL pilot reference signals 930a, 930b, 1030a, 1030b, 1050, removes redundant ones of the initially assigned UL pilot reference signals 930a, 930b, 1030a, 1030b, 1050, and transmits a true subset of the initially assigned UL pilot reference signals 930a, 930b, 1030a, 1030b, 1050.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for assigning uplink pilot reference signals, the method comprising a wireless device:
   receiving an uplink grant and a downlink assignment for the wireless device, the uplink grant being associated with initially assigned uplink pilot reference signals;
   determining at least one reciprocity pilot reference signal from the initially assigned uplink pilot reference signals, the uplink grant, and the downlink assignment;
   transmitting the at least one reciprocity pilot reference signal in the uplink grant;
   wherein the uplink grant spans a first frequency interval and the downlink assignment spans a second frequency interval; and wherein the at least one reciprocity pilot reference signal spans the first frequency interval and the second frequency interval.

2. The method of claim 1, wherein determining the at least one reciprocity pilot reference signal comprises removing redundant initially assigned uplink pilot reference signals from initially assigned uplink pilot reference signals.

3. The method of claim 1, wherein determining the at least one reciprocity pilot reference signal comprises:
determining a union of the initially assigned uplink pilot reference signals; and
determining a true subset of the initially assigned uplink pilot reference signals by removing redundant initially assigned uplink pilot reference signals from the union, the true subset defining the at least one reciprocity pilot reference signal.

4. The method of claim 1, wherein the at least one reciprocity pilot reference signal represents at least part of a Demodulation Reference Signal or a Sounding Reference Signal.

5. The method of claim 1, wherein the at least one reciprocity pilot reference signal represents a combination of at least two Demodulation Reference Signals, or a combination of at least one Demodulation Reference Signal and at least one Sounding Reference Signal.

6. The method of claim 1:
wherein the wireless device applies beamforming during the uplink grant; and
wherein at least two of the initially assigned uplink pilot reference signals are combined if same precoding is used for channel sounding during the beamforming.

7. The method of claim 1, wherein the at least one reciprocity pilot reference signal during the uplink grant is transmitted so as to leave free at least one transmission time interval or orthogonal frequency-division multiplexing symbol at the end of the uplink grant.

8. A method for detecting uplink pilot reference signals, the method comprising a network node:
sending, to a wireless device, an uplink grant spanning a first frequency interval and a downlink assignment spanning a second frequency interval;
receiving transmission from a wireless device in the uplink grant, the transmission comprising at least one reciprocity pilot reference signal spanning the first frequency interval and a second frequency interval;
determining that at least one pilot reference signal is missing from the transmission; and
detecting the at least one reciprocity pilot reference signal based on the at least one pilot reference signal being missed.

9. The method of claim 8, further comprising:
determining a precoder to be used by the wireless device in a next uplink grant based on the at least one reciprocity pilot reference signal; and
transmitting, in a downlink assignment to the wireless device, signaling identifying the precoder.

10. The method of claim 8, wherein the determining that the at least one pilot reference signal is missing is based on channel estimates of the transmission.

11. The method of claim 8, wherein determining that the at least one pilot reference signal is missing is based on signaling previously having been transmitted by the network node to the wireless device.

12. The method of claim 11, wherein the signaling comprises an assignment of the at least one reciprocity pilot reference signal to be used by the wireless device in the uplink grant.

13. The method of claim 11, wherein the at least one reciprocity pilot reference signal is assigned by the network node for at least one of coherent demodulation of uplink transmission from the wireless device and coherent demodulation of downlink transmission from the network node.

14. The method of claim 11, wherein the at least one reciprocity pilot reference signal is assigned by the network node for channel sounding needed by the network node for precoding subsequent downlink transmissions to the wireless device.

15. The method of claim 8, wherein the determining that the at least one pilot reference signal is missing comprises:
detecting a union of pilot reference signals in the transmission; and
determining that the at least one pilot reference signal is missing from the union.

16. The method of claim 8, further comprising, prior to receiving the at least one reciprocity pilot reference signal, transmitting an uplink grant and a downlink assignment for the wireless device to the wireless device, the uplink grant being associated with initially assigned uplink pilot reference signals.

17. A wireless device for assigning uplink pilot reference signals, the wireless device comprising:
processing circuitry;
memory containing instructions executable by the processing circuitry whereby the wireless device is operative to:
receive an uplink grant and a downlink assignment for the wireless device, the uplink grant being associated with initially assigned uplink pilot reference signals;
determine at least one reciprocity pilot reference signal from the initially assigned uplink pilot reference signals, the uplink grant, and the downlink assignment;
transmit the at least one reciprocity pilot reference signal in the uplink grant,
wherein the uplink grant spans a first frequency interval and the downlink assignment spans a second frequency interval; and
wherein the at least one reciprocity pilot reference signal spans the first frequency interval and the second frequency interval.

18. A network node for detecting uplink pilot reference signals, the network node comprising:
processing circuitry;
memory containing instructions executable by the processing circuitry whereby the network node is operative to:
send, to a wireless device, an uplink grant spanning a first frequency interval and a downlink assignment spanning a second frequency interval;
receive transmission from a wireless device in an uplink grant, the transmission comprising at least one reciprocity pilot reference signal spanning the first frequency interval and a second frequency interval;
determine that at least one pilot reference signal is missing from the transmission; and
detect the at least one reciprocity pilot reference signal based on the at least one pilot reference signal being missed.

19. A method for assigning uplink pilot reference signals, the method comprising a wireless device:
receiving an uplink grant and a downlink assignment for the wireless device, the uplink grant being associated with initially assigned uplink pilot reference signals;

determining at least two reciprocity pilot reference signals from the initially assigned uplink pilot reference signals, the uplink grant, and the downlink assignment;

transmitting the at least two reciprocity pilot reference signals in the uplink grant;

wherein the uplink grant spans a first frequency interval and the downlink assignment spans a second frequency interval; and wherein each individual reciprocity pilot reference signal spans less than the first frequency interval and the second frequency interval.

20. A method for detecting uplink pilot reference signals, the method comprising a network node:

sending, to a wireless device, an uplink grant spanning a first frequency interval and a downlink assignment spanning a second frequency interval;

receiving a transmission from a wireless device in the uplink grant, the transmission comprising at least two reciprocity pilot reference signals, each spanning less than the first frequency interval and a second frequency interval;

determining that at least one pilot reference signal is missing from the transmission; and detecting the at least one reciprocity pilot reference signal based on the at least one pilot reference signal being missed.

21. A wireless device for assigning uplink pilot reference signals, the wireless device comprising:

processing circuitry;

memory containing instructions executable by the processing circuitry whereby the wireless device is operative to:

receive an uplink grant and a downlink assignment for the wireless device, the uplink grant being associated with initially assigned uplink pilot reference signals;

determine at least two reciprocity pilot reference signals from the initially assigned uplink pilot reference signals, the uplink grant, and the downlink assignment;

transmit the at least two reciprocity pilot reference signals in the uplink grant;

wherein the uplink grant spans a first frequency interval and the downlink assignment spans a second frequency interval; and wherein each individual reciprocity pilot reference signal spans less than the first frequency interval and the second frequency interval.

22. A network node for detecting uplink pilot reference signals, the network node comprising:

processing circuitry;

memory containing instructions executable by the processing circuitry whereby the network node is operative to:

send, to a wireless device, an uplink grant spanning a first frequency interval and a downlink assignment spanning a second frequency interval;

receive a transmission from a wireless device in the uplink grant, the transmission comprising at least two reciprocity pilot reference signals, each spanning less than the first frequency interval and a second frequency interval;

determine that at least one pilot reference signal is missing from the transmission; and detect the at least one reciprocity pilot reference signal based on the at least one pilot reference signal being missed.

* * * * *